Figure 1:
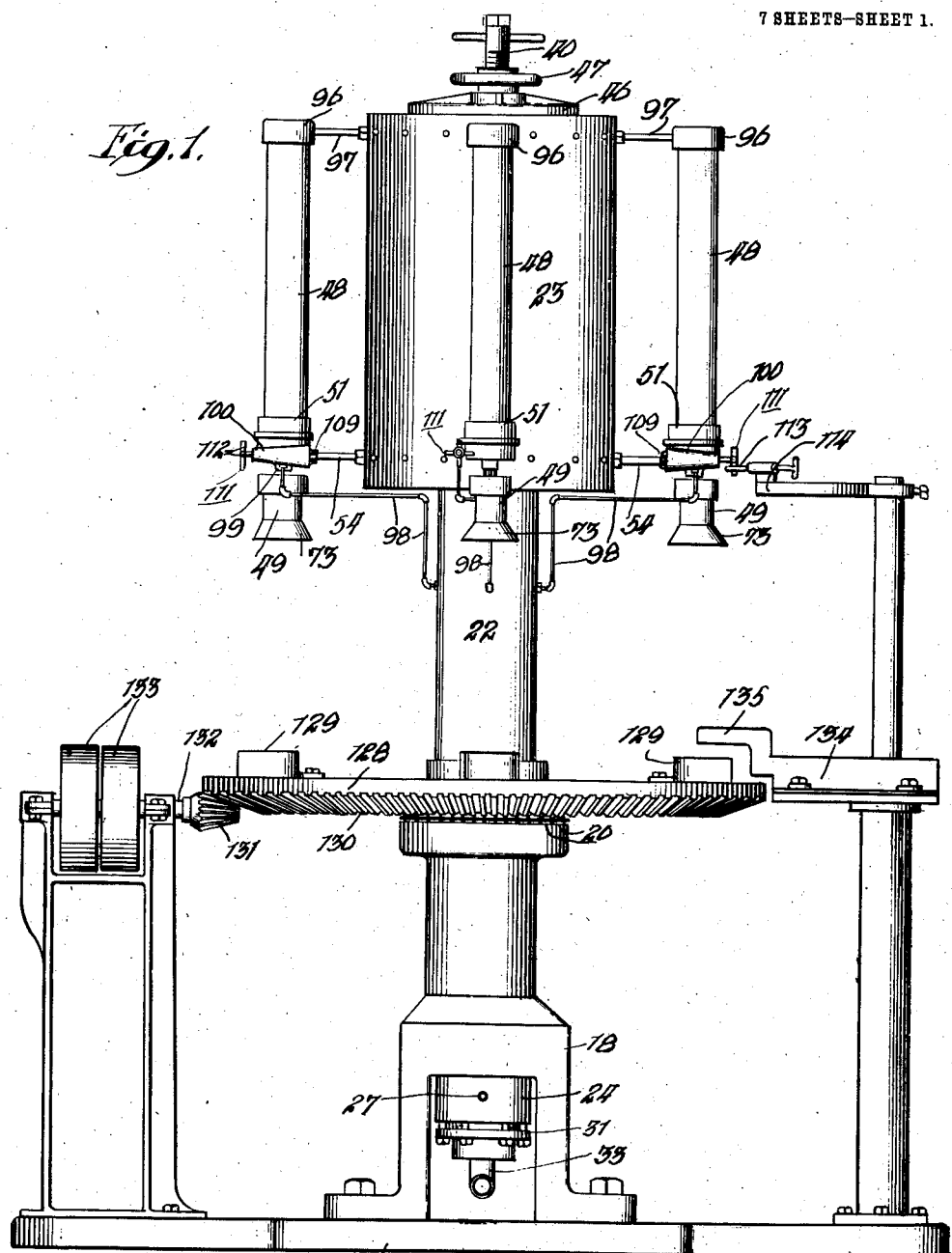

A. SCHNEIDER.
MACHINE FOR BOTTLING LIQUIDS.
APPLICATION FILED AUG. 23, 1909. RENEWED APR. 6, 1911.

1,010,692.

Patented Dec. 5, 1911.
7 SHEETS—SHEET 1.

Witnesses:
Inventor:
Adolph Schneider
by Banning & Banning
Attys.

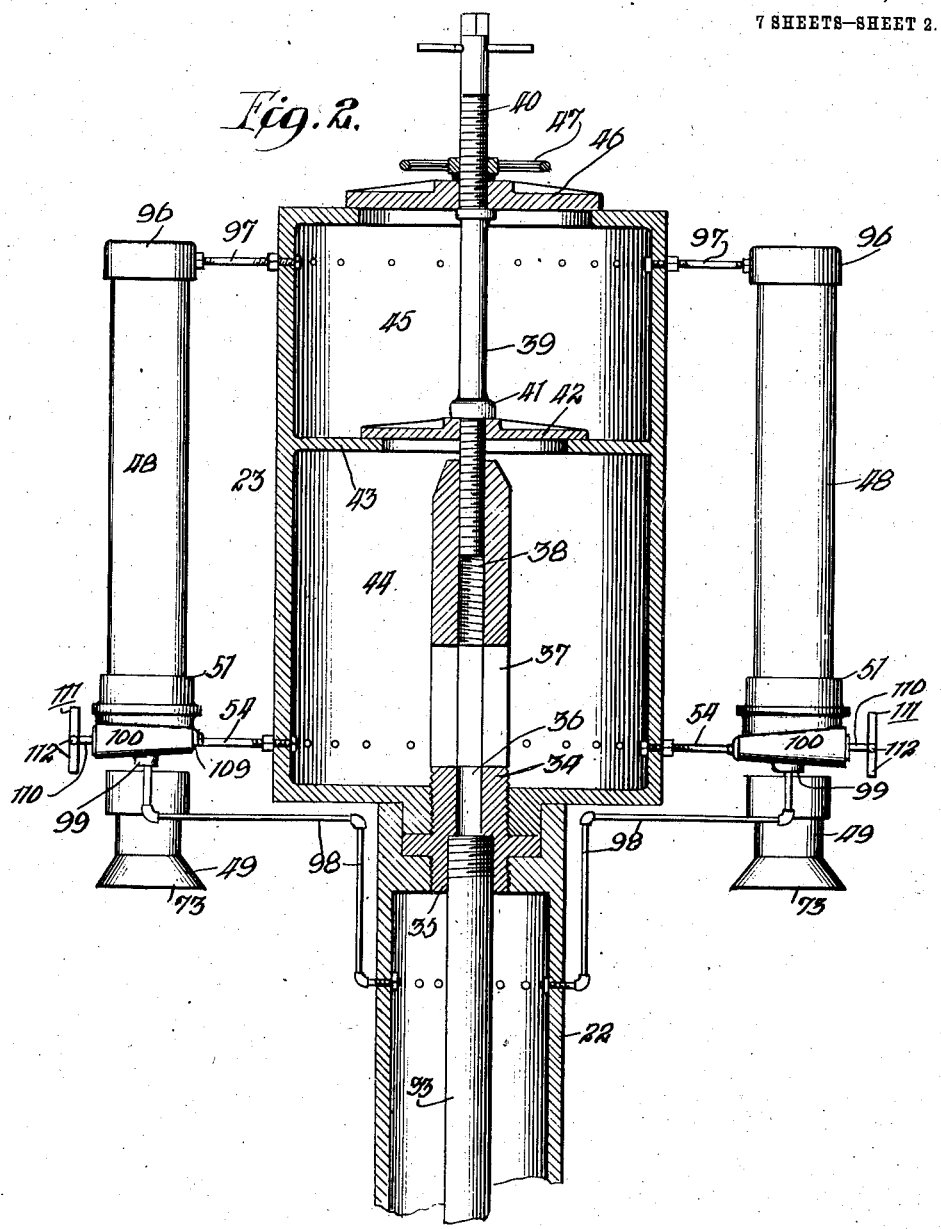

A. SCHNEIDER.
MACHINE FOR BOTTLING LIQUIDS.
APPLICATION FILED AUG. 23, 1909. RENEWED APR. 6, 1911.
1,010,692.
Patented Dec. 5, 1911.
7 SHEETS—SHEET 3.
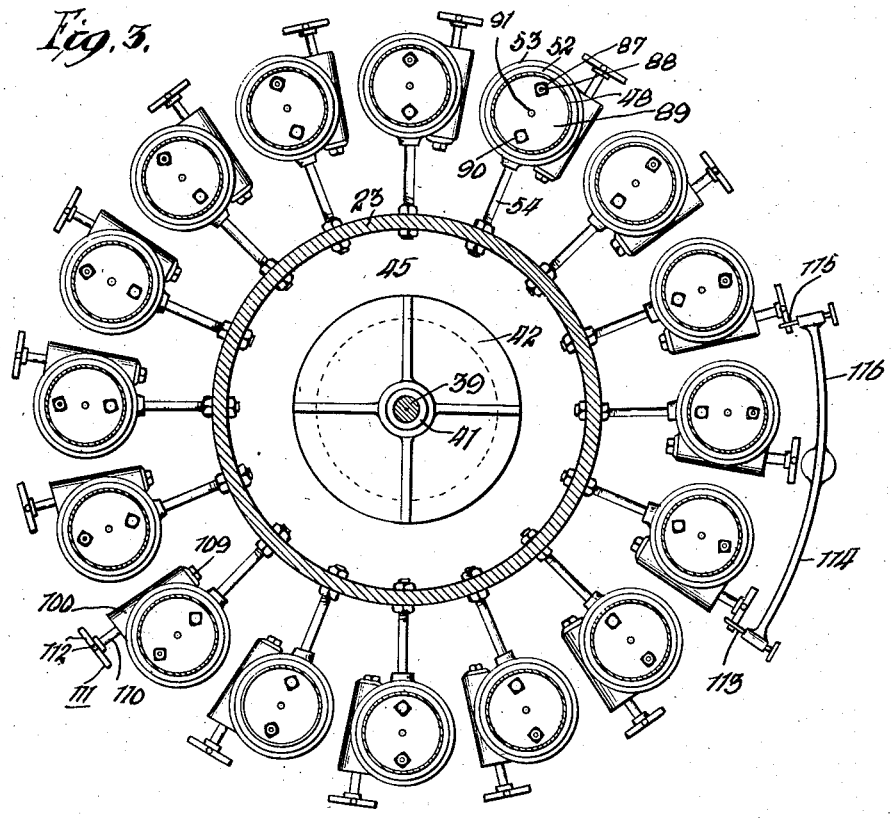
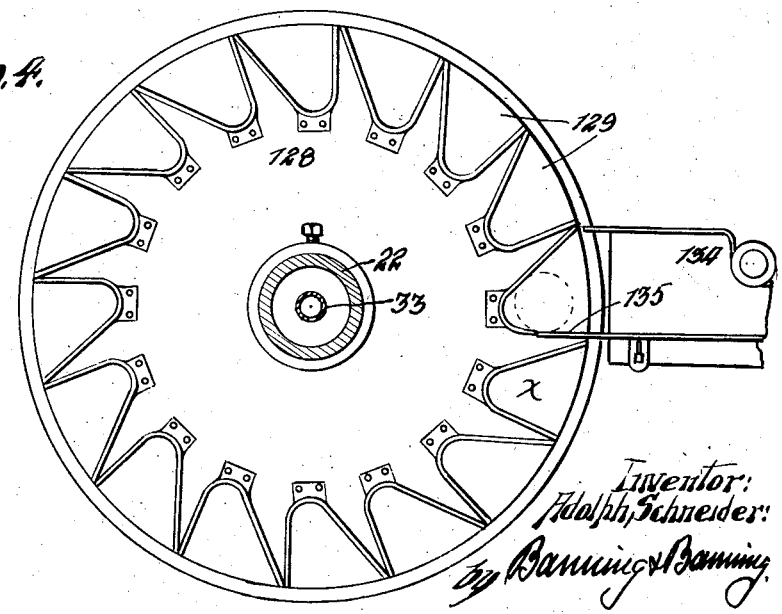

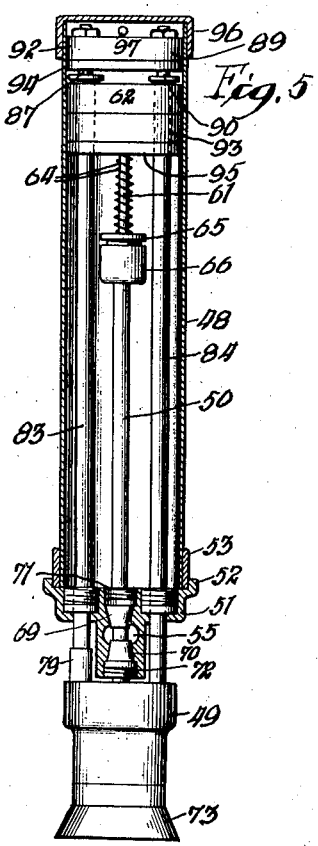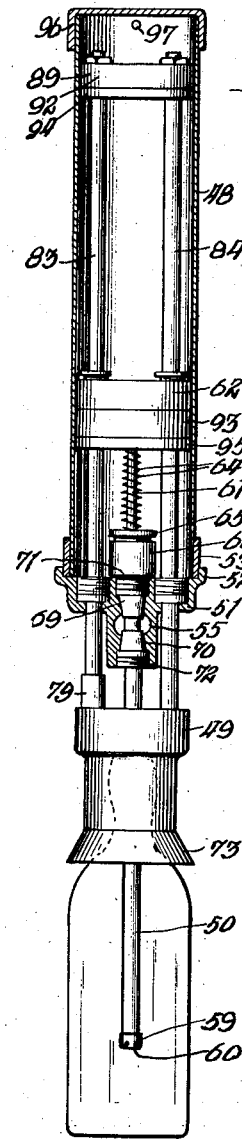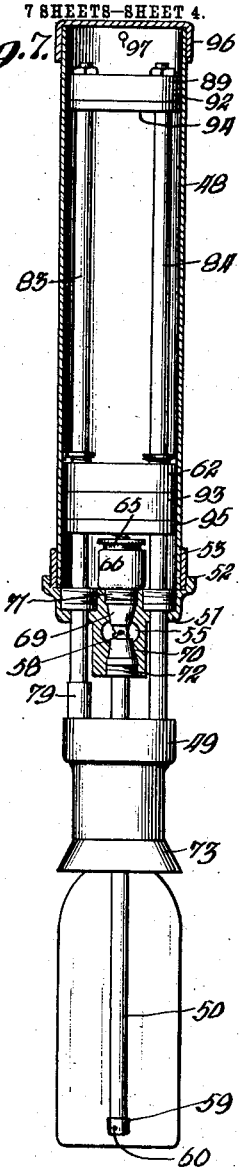

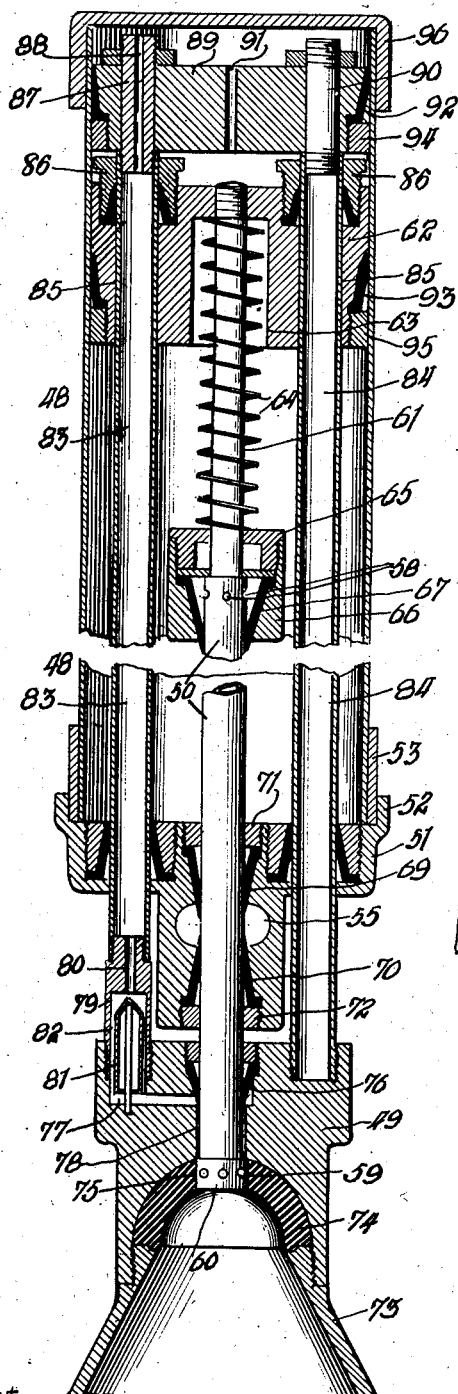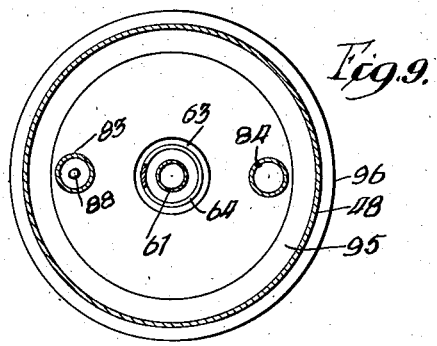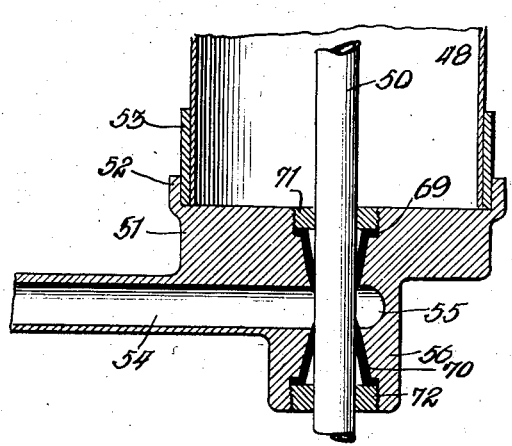

A. SCHNEIDER.
MACHINE FOR BOTTLING LIQUIDS.
APPLICATION FILED AUG. 23, 1909. RENEWED APR. 6, 1911.
1,010,692.
Patented Dec. 5, 1911.
7 SHEETS—SHEET 6.
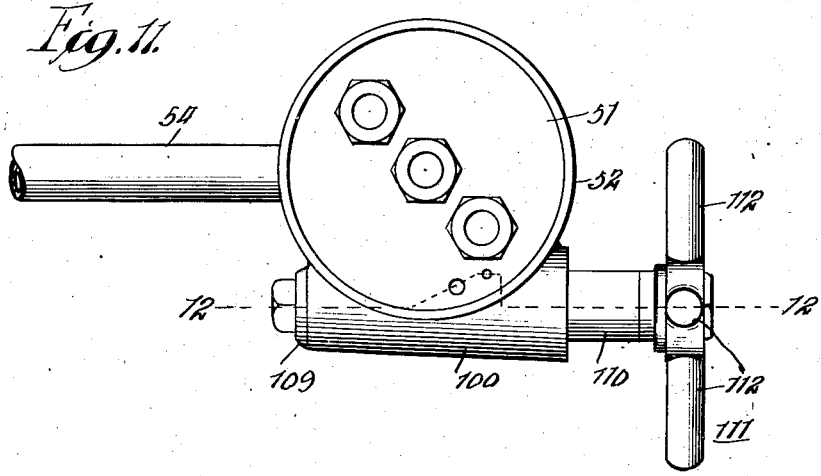
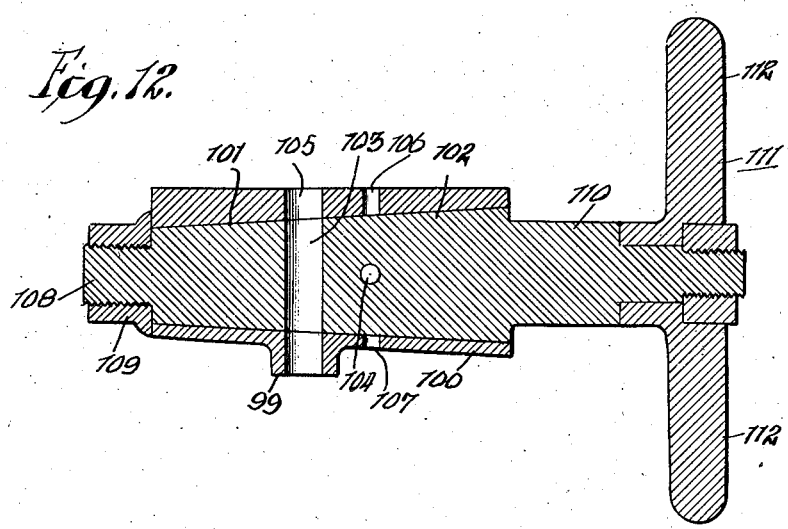
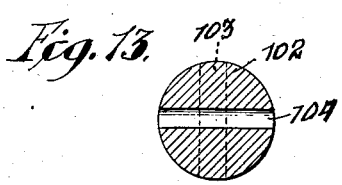
Witnesses:
Wm P. Bond
Mary Frost
Inventor:
Adolph Schneider
by Banning & Banning
Attys.

A. SCHNEIDER.
MACHINE FOR BOTTLING LIQUIDS.
APPLICATION FILED AUG. 23, 1909. RENEWED APR. 6, 1911.
1,010,692.
Patented Dec. 5, 1911.
7 SHEETS—SHEET 7.
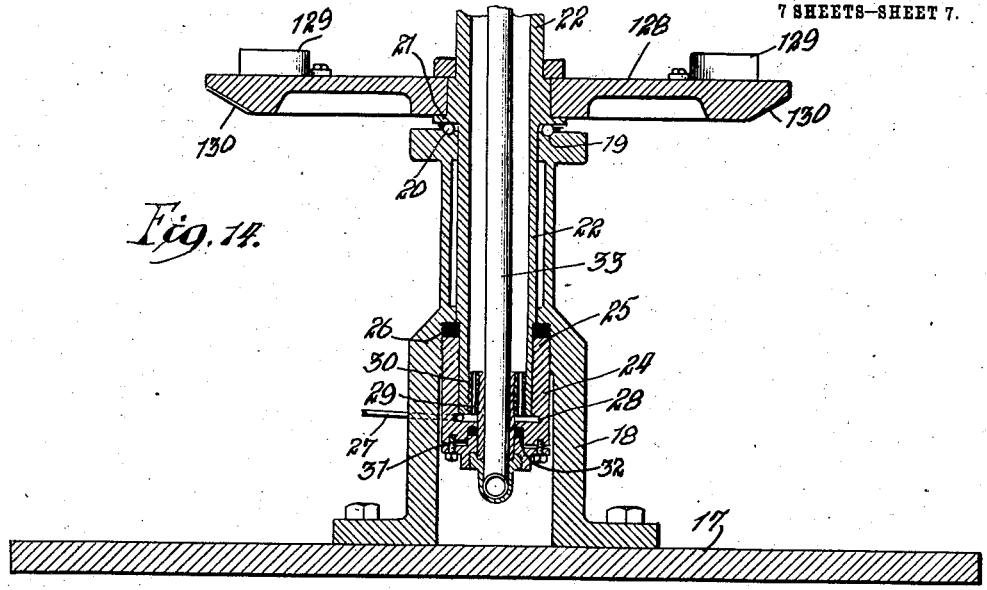
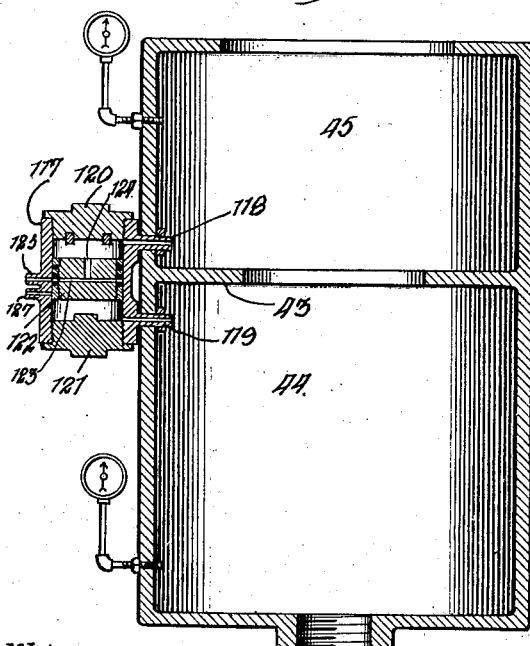
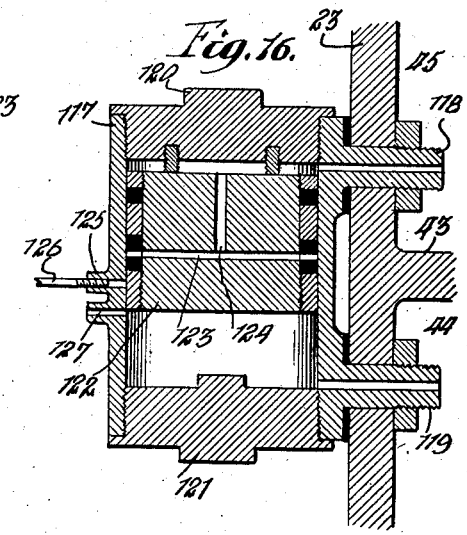
Witnesses:
Inventor
Adolph Schneider
by Banning & Banning
Attys.

UNITED STATES PATENT OFFICE.

ADOLPH SCHNEIDER, OF CHICAGO, ILLINOIS.

MACHINE FOR BOTTLING LIQUIDS.

1,010,692. Specification of Letters Patent. Patented Dec. 5, 1911.

Application filed August 23, 1909, Serial No. 514,218. Renewed April 6, 1911. Serial No. 619,401.

*To all whom it may concern:*

Be it known that I, ADOLPH SCHNEIDER, a citizen of the United States, residing at Chicago, in the county of Cook and State of Illinois, have invented certain new and useful Improvements in Machines for Bottling Liquids, of which the following is a specification.

This invention relates to a machine for bottling liquids, such as beer or carbonated beverages, in bottles and under pressure; and the object of the invention is to so arrange the machine as a whole that the bottles can be successively positioned on a rotating platform and thereafter automatically sealed, charged with pressure from the tank filled with liquid, and again unsealed in position to be removed after complete revolution of the platform.

In certain prior constructions it has been the practice to mount the bottles on individually movable platforms adapted to be successively raised to sealing position against a stationary sealing head; but the machine of the present invention reverses this operation and provides means for lowering the sealing heads against the sealing and filling devices and eliminating a multiplication of pneumatically operating devices with the attendant waste of pressure due to the increased number of operations and to unavoidable leakage of the medium under pressure.

The invention particularly relates to the construction and arrangement of the tank as a whole, and to the mounting therefor; to the construction and arrangement of the cylinders and pistons for actuating the sealing heads and filling tubes; to the means provided for admitting and venting the pressure; to the automatic trip mechanism for regulating the several operations at the proper intervals; and to the machine as a whole and the individual parts thereof.

Further objects and features will appear from a detailed description of the invention, which consists in the features of construction and combination of parts hereinafter described and claimed.

In the drawings, Figure 1 is a side elevation of the machine as a whole, showing most of the sealing heads and adjacent mechanism removed; Fig. 2 a sectional elevation, taken through the tank, and showing two sealing heads and their cylinders in elevation; Fig. 3 a cross sectional view, taken through the tank and through the connected cylinders; Fig. 4 a plan view of the platform for supporting the bottles; Figs. 5, 6, and 7, sectional elevations of the cylinders, showing the parts in initial, intermediate, and final positions of adjustment; Fig. 8 an enlarged sectional detail of one of the cylinders and sealing heads, with the center portion of the cylinder broken away; Fig. 9 a cross sectional view of one of the cylinders; Fig. 10 a cross sectional view of the base fitting for one of the cylinders; Fig. 11 a top or plan view of the same, showing the star trip wheel; Fig. 12 an enlarged sectional detail of the valve, taken on line 12—12 of Fig. 11; Fig. 13 a cross sectional view of the valve plug of Fig. 12; Fig. 14 a sectional elevation of the base portion of the machine; Fig. 15 a sectional elevation of the chambered liquid tank, showing the pressure equalizer attached thereto; and Fig. 16 an enlarged sectional detail of the pressure equalizer.

The device as a whole is carried by a base frame 17 provided, at its center, with an upwardly extending tubular post or column 18 having, on its upper end, a channel 19 which furnishes a runway for ball bearings 20 which bear against a ledge or shoulder 21 formed on the outer surface of a main tubular stem 22 which, at its upper end, furnishes a support for a cylindrical liquid tank 23. The lower end of the tubular stem is entered into a recessed cylindrical socket 24, the upper end 25 of which is screw-threaded into the lower portion of the tubular column 18, a packing 26 being provided to prevent leakage of air around the outside of the tubular stem. Air or other medium under pressure is admitted through a pipe 27 which communicates with an annular channel 28 in the socket 24, and communication is established between the annular channel and the interior of the tubular stem through holes 29 in a bushing 30 which is threaded into the end of the tubular stem. The bushing surrounds a depending sleeve 31 which is entered through a stuffing box 32, bolted or otherwise secured to the lower end of the socket 24. The sleeve surrounds a liquid supply pipe 33 which extends up through the tubular stem 22 and communicates with the interior of the tank, and has its upper end entered into a plug 34 which is threaded into the bottom of the tank and has the tubular stem threaded onto its depending lower end 35, the plug furnishing a connection between the tank and the stem.

The plug is provided with a central bore 36 in register with the end of the liquid supply pipe 33, which bore communicates with lateral slots 37 forming passageways leading into the interior of the tank. The upper end of the plug is provided with a screw-threaded recess 38 which receives the lower threaded end of an adjusting stem 39 provided, near its upper end, with a threaded portion 40. The adjusting stem, near its lower end, is provided with a ledge or shoulder 41 which engages the upper side of an inner cover 42, the edges of which bear against the rim of an inwardly extending annular ledge or shoulder 43, which, in combination with the inner cover, furnishes a partition dividing the tank into a lower liquid chamber 44 and an upper or pressure chamber 45. The adjusting stem is also entered through an outer cover 46, the edge of which bears against the rim of the annular top wall of the tank and is adapted to be tightly compressed thereonto by the action of a wheel 47 which engages the threaded upper portion 40 of the adjusting stem, and is adapted to be turned to exert the necessary pressure on the outer cover.

The tank furnishes a support for a plurality of vertically disposed cylinders 48 which are arranged in a ring around the exterior of the tank, and each of the cylinders serves to actuate a sealing head 49 and a filling tube 50. Each of the cylinders is supported upon a disk-shaped base fitting 51, provided, around its upper edge, with a flange 52 which engages a ring 53 embracing the lower end of the cylinder wall. Each of the fittings is provided with an inwardly extending liquid supply passage 54 which communicates with an annular chamber 55 formed in a neck 56, through which extends the filling tube 50 provided, near its upper end, with a plurality of inlet holes 58, shown in Figs. 7 and 8 and so arranged that when the filling tube is lowered, as shown in Fig. 7, the holes will register with the annular chamber 55 and permit the liquid to enter the filling tube and to be discharged therefrom from one or more discharge openings 59 formed in a slightly enlarged discharging cap 60 at the extreme lower end of the filling tube. The upper end of the filling tube has entered thereinto a stem 61, the upper end of which is threaded into a secondary piston 62 provided with a counterbore socket recess 63 which receives the upper end of a coil spring 64, the lower end of which abuts against a plug 65 which is threaded into a sealing block 66 which surrounds the upper end of the filling tube.

The sealing block carries an inverted tapered sealing thimble 67, which bears against the filling tube and serves to seal the inlet holes 58 when the filling tube is in its raised position, as shown in Fig. 8, in which position the end of the filling tube, which is of slightly greater diameter than the stem 61, will abut against a washer 68, which is interposed between the upper edge of the thimble and the plug 65 which is threaded into the sealing block. This arrangement is necessary in order to prevent the ingress of the medium under pressure into the filling tube when admitted below the secondary cylinder. The filling tube passes through the center of the neck 56 of the base fitting, and through upper and lower gaskets 69 and 70, respectively, which project in opposite directions and terminate at or near the annular chamber 55, which gaskets are compressed by means of screw-threaded plugs 71 and 72, or in any other suitable manner. The lower end of the filling tube enters the stem of the sealing head 49, which sealing head is provided with a flaring mouth 73, the throat of which bears against a hemispherical sealing gasket 74, of rubber or similar material, which is recessed to receive the mouth of the bottle and is provided, in its center, with a hole 75 of proper diameter to closely fit around and seal the enlarged discharging cap 60, being of a size, however, to afford a slight clearance around the filling tube proper when the latter is lowered, which clearance is necessary to permit of the ingress of air or other medium under pressure during the equalization of the pressure in the bottle with the pressure in the upper portion of the tank.

The stem of the ceiling head 49 is provided with a compressed gasket 76, furnishing, in effect, a stuffing box around the filling tube, in order to prevent leakage of air or other medium under pressure, which, during the equalizing action, is admitted through an inlet passage 77 which communicates with an annular passage 78 around the sealing tube, as shown in Fig. 8. The inlet passage communicates with a nipple 79 having an inlet port 80, which is adapted to be controlled by a float 81 located within a bore or chamber 82 formed in the nipple, and the upper end of the nipple has threaded thereonto a tubular piston rod 83 which coöperates with a companion tubular piston rod 84 on the other side of the cylinder, which, however, differs from the rod 83, in that its lower end is entered directly into the upper face of the stem of the sealing head instead of being secured to a nipple interposed between the tubular piston rod and the stem of the sealing head, as is the case with the tubular piston rod 83. The companion tubular piston rods are slidably entered through guide holes 85 in the secondary piston and through stuffing boxes 86. The upper end of the tubular piston rod 83 is screw-threaded onto a tubular stem 87 provided with a port or passageway 88, which stem is entered through the primary piston 89, and the companion tubular piston rod 84 is likewise threaded onto a stem 90, which, however, may be solid, since no pressure passage is required. The primary piston is provided, in its center, with a restricted pressure passage 91, and the primary and secondary pistons are provided with packing rings 92 and 93 which are clamped in place by clamping rings 94 and 95, respectively. The upper end of the cylinder is closed by means of a cap or head 96, which has entered thereinto a pressure supply pipe 97 which is entered through the wall of the pressure chamber of the tank and maintains a constant and uninterrupted communication between the top of the cylinder and the interior of the top chamber of the tank.

The medium under pressure which is admitted through the pipe 27 and passes through the tubular stem 22 is communicated to the cylinders through lower pressure supply pipes 98, each of which has its outer end entered into a nipple 99 depending from a valve casing 100, which is cast or otherwise formed on the under side of the base fitting near one edge thereof, as best indicated in Fig. 11. The valve casing has a tapered bore 101 which receives a tapered plug valve 102 having a pressure supply port 103 and a vent port 104 arranged in transverse relation with respect to one another. The pressure supply passage in the plug is adapted to register with a pressure inlet opening 105 which leads directly to the cylinder. The vent port 104, in like manner, communicates with inner and outer vent openings 106 and 107, respectively, which serve to establish communication between the atmosphere and the interior of the bottom portion of the cylinder. The valve plug is provided, on its smaller end, with a reduced stud 108, which receives a nut 109 bearing against the end of the casing, and the opposite end of the plug is provided with a stem 110, which has mounted thereon a star wheel 111 having four arms 112, any one of which arms is adapted to engage with and be initially tripped by a primary trip finger 113 inwardly projecting from the end of a forward arm 114, and the primary trip or actuating finger coöperates with a secondary or reversing trip finger 115 on the end of a rear arm 116, the point of application of the bottles to the machine being indicated by X in Fig. 4.

In order to equalize the pressure in the upper and lower sections of the tank, the equalizer shown in Figs. 15 and 16 is provided. This equalizer comprises a cylinder 117 having upper and lower nipples 118 and 119 which communicate with the upper and lower chambers of the tank, respectively. The upper and lower ends of the cylinder are inclosed by upper and lower caps 120 and 121, respectively, and within the cylinder is a piston 122 having a cross passage 123 which communicates with a vertical center passage 124. The wall of the cylinder is provided, at a suitable point, with an inlet nipple 125 which receives the end of a pressure supply pipe or tube 126 leading from a suitable source of pressure supply. Immediately below the inlet nipple is a vent nipple 127, the arrangement and location of the various nipples being such that when there is an excess of pressure in the lower chamber the piston will be elevated, as shown in Fig. 16, and will remain elevated until sufficient pressure has been vented from the lower chamber through the vent nipple 127 to equalize the pressure in the two chambers, which will permit the piston to descend sufficiently to close the opening in the vent nipple. Should the pressure be excessive in the upper chamber, the piston will descend, and permit the venting of pressure from the farther chamber through the passages 124 and 123 and the vent nipple 127.

The bottles are supported upon a circular platform 128 which, as shown in Fig. 4, is provided, around its periphery, with a plurality of shoes 129, each of which is in the form of a V-shaped flange or wall, converging toward the center and open at the outside to receive the bottles intended to be sealed and filled. The platform is provided, on its under face, with bevel teeth 130 which engage with the bevel pinion 131 on a power shaft 132 provided with fast and loose pulleys 133. The bottles are discharged onto a stationary table 134, which is provided with a forwardly extending arm 135 located above the line of travel of the shoes and adapted to engage the side of a bottle and arrest its progress and cause it to roll off in standing position onto the stationary table, which operation is facilitated by the shape of the shoe—the rear edge of which extends rearwardly and diagonally as regards the radius of the platform.

The operation of the device is as follows: The lower chamber of the tank is supplied with liquid which is admitted through the centrally disposed stationary pipe 33, entering the bottom of the tank and being discharged through the slots 37 in the centrally disposed plug 34, which revolves with the tank and the tubular stem 22 which carries the platform. The entire upper portion of the machine finds a support upon the ball bearings 20 which rest upon the top of the base column or support, and the parts are held against any tilting by the lower end of the tubular stem which finds a bearing within the socket member 24, near the extreme base of the machine. Normal pressure, somewhat above atmospheric pressure, is maintained in the pressure chamber of the tank and in the liquid chamber, which pressure in the two chambers is equalized by the action of the equalizer, which rises and falls in the manner previously described as the pressure varies in the two chambers. With a normal pressure thus established, the machine is in condition for operation. The machine will be revolved at a constant speed by the engagement of the bevel pinion 131 with the bevel teeth 130, and the bottles will be inserted as the shoes successively travel past the point of insertion, which is a point slightly to the rear of the operating trip finger 113. At the time a bottle is inserted, the valve plug will be turned to the position shown in Fig. 12, in which the pressure supply port 103 is opened to and communicates with the lower portion of the cylinder. The pressure supply port receives a medium under pressure from the pipe 98, and this pressure, which may be termed the operating pressure, will be in excess of the normal pressure freely and constantly admitted from the tank to the upper portion of the cylinder, so that the excessive pressure from below will maintain the primary and secondary pistons in raised position. After the insertion of the bottle, the continued revolution of the platform will bring one of the arms of the star wheel into engagement with the initial or operating trip finger 113, and this engagement will serve to turn the star wheel one-quarter of a revolution, which will turn the valve plug to a position in which the vent ports and passages 104, 106 and 107 are brought into register, thereby allowing the excessive pressure in the lower part of the cylinder to be vented and permitting the normal pressure of the medium contained in the upper portion of the cylinder to act.

With the parts in the position shown in Fig. 5, the normal pressure will initially act on both the primary and secondary pistons, which will move together, aided by gravity, until the sealing gasket 74 is brought into engagement with the mouth of the bottle, which arrests the movement of the primary piston but holds the gasket under sufficient pressure to maintain a firm seal around the mouth of the bottle during the subsequent operations. After the arrest of movement of the sealing gasket, the filling tube will continue to move downwardly, with the initial result that the enlarged discharging cap 60, on the end of the filling tube, will be projected below the wall of the gasket, thereby permitting the normal pressure from the top of the tank to flow down through the tubular piston rod 83, through the nipple 79, through the passages 77 and 78, and into the mouth of the bottle, thereby equalizing the pressure between the bottle and the top of the tank, so that equalization of pressure is established between the interior of the bottle and the liquid to be admitted thereinto. As the filling tube continues to descend the sealing block 66 will be brought into engagement with the floor of the cylinder. This arrests the movement of the sealing thimble 67, after, however, arresting the movement of the filling tube, which will continue to descend against the tension of the spring 64 until the inlet holes 58 are brought into register with the annular chamber 55, which permits the liquid admitted through the pipe or passage 54 to enter the filling tube and be discharged under conditions of equalized pressure into the bottom of the bottle. The liquid in the bottle will continue to rise until it flows through the passages 78 and 77 in sufficient volume to raise the float 82 which closes the port 80, thereby preventing back flow of pressure to the tank and stopping the inflow of liquid into the bottle. After the bottle has been completely filled in the manner described, the continued revolution of the platform will carry the star wheel almost completely around its circle and bring it into engagement with the reversing trip finger 115. This finger will serve to give the star wheel a quarter of a revolution, thereby reversing the position of the valve plug within its casing, closing the vent and admitting the superior actuating pressure to flow into the lower portion of the cylinder, which will immediately counteract the lesser effect of the normal pressure and quickly raise the filling tube to its initial position. With the first backward movement of the filling tube, the spring 64 will serve to hold the sealing block 66 in contact with the flare of the cylinder until the inlet openings 58 have been fully housed within the sealing thimble 67, so that medium under pressure from the lower part of the cylinder will be denied admission into the interior of the filled bottle. The secondary cylinder, which carries the filling tube, will continue to rise, moving along the tubular piston rods 83 and 84 as guideways, until it engages the primary piston, after which the two pistons will move up together for such distance as may be sufficient to unseal and release the bottle and permit it to be removed from the machine, which removal will be automatic by the action of the arm 135 which engages the bottles and scoops them off onto the stationary table 134, where they can be immediately corked for shipment.

The operation of the machine as a whole is extremely satisfactory, for the reason that no valve connections are needed to control the flow of the normal pressure to the upper portions of the cylinders, so that there is no danger of leakage or loss of energy at these points. Moreover, the actuating and reversing operations are controlled by a single valve of the simplest character, so that danger of leakage at such points is practically eliminated. Furthermore, the arrangement is one which utilizes one of the tubular piston rods as an equalizing passage, thereby simplifying the construction to a considerable degree. The arrangement of the cylinders around the piston results in a very compact machine of high capacity, which can be operated with the expenditure of but a small amount of power and can be easily handled from a single point of operation, which is such as to enable the attendant to both supply the empty bottles and remove the filled bottles, without difficulty.

I claim:

1. In a machine for bottling liquids, the combination of a liquid tank, means for rotating the tank, means rotatable with the tank for supporting a plurality of bottles, a plurality of cylinders connected and rotatable with the tank, each cylinder carrying a sealing head and a filling tube, connections between the tank and the filling tube for supplying liquid to the filling tube, connections between the tank and the sealing head for establishing equalized pressure between the tank and the bottle, a primary piston within the cylinder connected with the sealing head and adapted to actuate the same and provided with a pressure passage therethrough, a piston connected with and adapted to actuate the filling tube under the influence of a medium under pressure admitted through the pressure passage in the first mentioned piston, a continuously open pressure supply pipe leading from the top of the cylinder to the top of the tank for supplying a medium under a relatively low pressure to the top of the cylinder, an actuating pressure supply pipe adapted to admit a medium under a relatively high pressure at the bottom of the cylinder, and a valve for controlling the last mentioned passage, substantially as described.

2. In a machine for bottling liquids, the combination of a liquid tank, means for rotating the tank, means rotatable with the tank for supporting a plurality of bottles, a plurality of cylinders connected and rotatable with the tank, each cylinder carrying a sealing head and a filling tube, connections between the tank and the filling tube for supplying liquid to the filling tube, connections between the tank and the sealing head for establishing equalized pressure between the tank and the bottle, a primary piston within the cylinder connected with the sealing head and adapted to actuate the same and provided with a pressure passage therethrough, a piston connected with and adapted to actuate the filling tube under the influence of a medium under pressure admitted through the pressure passage in the first mentioned piston, a continuously open pressure supply pipe leading from the top of the cylinder to the top of the tank for supplying a medium under a relatively low pressure to the top of the cylinder, an actuating pressure supply pipe adapted to admit a medium under a relatively high pressure at the bottom of the cylinder, a valve for controlling the last mentioned passage, and trip devices for automatically admitting a medium under pressure to and venting such medium under pressure from the cylinder at stated points in the rotation of the tank, substantially as described.

3. In a machine for bottling liquids, the combination of a liquid tank, means for rotating the tank, means rotatable with the tank for supporting a plurality of bottles, a plurality of cylinders connected and rotatable with the tank, each cylinder carrying a sealing head and a filling tube, connections between the tank and the filling tube for supplying liquid to the filling tube, connections between the tank and the sealing head for establishing equalized pressure between the tank and the bottle, a primary piston within the cylinder connected with the sealing head and adapted to actuate the same and provided with a pressure passage therethrough, a piston connected with and adapted to actuate the filling tube under the influence of a medium under pressure admitted through the pressure passage in the first mentioned piston, a continuously open pressure supply pipe leading from the top of the cylinder to the top of the tank for supplying a medium under a relatively low pressure to the top of the cylinder, an actuating pressure supply pipe adapted to admit a medium under a relatively high pressure at the bottom of the cylinder, a valve for controlling the last mentioned passage, and trip mechanism adapted to actuate said valve for admitting an actuating medium under pressure to the cylinder and venting such medium under pressure therefrom at stated periods in the rotation of the tank, substantially as described.

4. In a machine for bottling liquids, the combination of a liquid tank, means for rotating the tank, means rotatable with the tank for supporting a plurality of bottles, a plurality of cylinders connected and rotatable with the tank, each cylinder carrying a sealing head and a filling tube, connections between the tank and the filling tube for supplying liquid to the filling tube, connections between the tank and the sealing head for establishing equalized pressure between the tank and the bottle, a primary piston within the cylinder connected with the sealing head and adapted to actuate the same and provided with a pressure passage therethrough, a piston connected with and adapted to actuate the filling tube under the influence of a medium under pressure admitted through the pressure passage in the first mentioned piston, a continuously open pressure supply pipe leading from the top of the cylinder to the top of the tank for supplying a medium under a relatively low pressure to the top of the cylinder, an actuating pressure supply pipe adapted to admit a medium under a relatively high pressure at the bottom of the cylinder, a valve for controlling the last mentioned passage, a star wheel connected with the valve, and primary and secondary trip fingers adapted to be engaged by the star wheel at different points in the rotation of the tank for initially venting the actuating medium under pressure from the lower end of the cylinder and thereafter admitting such medium under pressure to the lower end of the cylinder for alternately lowering and raising the piston, substantially as described.

5. In a machine for bottling liquids, the combination of a rotatably mounted tank, a rotatably mounted platform for supporting a plurality of bottles below the tank, a plurality of cylinders connected with and movable with the tank, each of the cylinders having therein a primary and secondary piston, a connection between the upper end of the cylinder and the tank for constantly admitting the pressure within the tank to the upper end of the cylinder, a valve controlled connection with the lower end of the cylinder for admitting a relatively high actuating pressure to the lower end of the cylinder, automatic means for controlling the flow of the pressure through the last mentioned passage, a sealing head connected with the uppermost piston in the cylinder by means of a tubular piston rod adapted to convey the tank pressure to the sealing head for admission into the bottle, a filling tube connected with the lower piston and extending through the sealing head, and a liquid passage leading from the tank and adapted to communicate with the filling tube when in lowered position for supplying liquid to the bottle, substantially as described.

6. In a machine for bottling liquids, the combination of a rotatably mounted tank, a rotatably mounted platform for supporting a plurality of bottles below the tank, a plurality of cylinders connected with and movable with the tank, each of the cylinders having therein a primary and secondary piston, a connection between the upper end of the cylinder and the tank for constantly admitting the pressure within the tank to the upper end of the cylinder, a valve controlled connection with the lower end of the cylinder for admitting a relatively high actuating pressure to the lower end of the cylinder, automatic means for controlling the flow of the pressure through the last mentioned passage, a sealing head connected with the uppermost piston in the cylinder by means of a tubular piston rod adapted to convey the tank pressure to the sealing head for admission into the bottle, a filling tube connected with the lower piston and extending through the sealing head, a liquid passage leading from the tank and adapted to communicate with the filling tube when in lowered position for supplying liquid to the bottle, and a sealing device mounted upon the filling tube for sealing the upper end thereof against the ingress of a medium under pressure when the filling tube is raised, substantially as described.

7. In a machine for bottling liquids, the combination of a rotatably mounted tank, a rotatably mounted platform for supporting a plurality of bottles below the tank, a plurality of cylinders connected with and movable with the tank, each of the cylinders having therein a primary and secondary piston, a connection between the upper end of the cylinder and the tank for constantly admitting the pressure within the tank to the upper end of the cylinder, a valve controlled connection with the lower end of the cylinder for admitting a relatively high actuating pressure to the lower end of the cylinder, automatic means for controlling the flow of the pressure through the last mentioned passage, a sealing head connected with the uppermost piston in the cylinder by means of a tubular piston rod adapted to convey the tank pressure to the sealing head for admission into the bottle, a filling tube connected with the lower piston and extending through the sealing head, a liquid passage leading from the tank and adapted to communicate with the filling tube when in lowered position for supplying liquid to the bottle, a sealing device mounted upon the filling tube for sealing the upper end thereof against the ingress of a medium under pressure when the filling tube is raised, and a spring acting upon said sealing device for forcing the same into sealing position within the initial raising movement of the filling tube, substantially as described.

8. In a machine for bottling liquids, the combination of a rotatably mounted tank, a rotatably mounted platform for supporting a plurality of bottles below the tank, a plurality of cylinders connected with and movable with the tank, each of the cylinders having therein a primary and secondary piston, a connection between the upper end of the cylinder and the tank for constantly admitting the pressure within the tank to the upper end of the cylinder, a valve controlled connection with the lower end of the cylinder for admitting a relatively high actuating pressure to the lower end of the cylinder, automatic means for controlling the flow of the pressure through the last mentioned passage, a sealing head connected with the uppermost piston in the cylinder by means of a tubular piston rod adapted to convey the tank pressure to the sealing head for admission into the bottle, a filling tube connected with the lower piston and extending through the sealing head, a liquid passage leading from the tank and adapted to communicate with the filling tube when in lowered position for supplying liquid to the bottle, a sealing device mounted upon the filling tube for sealing the upper end thereof against the ingress of a medium under pressure when the filling tube is raised, and a float valve within the pressure supply passage leading to the sealing head, adapted to be raised by the inflow of liquid to close such passage and prevent the back-flow of medium under pressure from the bottle, substantially as described.

9. In a machine for bottling liquids, the combination of a rotatably mounted tank, a rotatably mounted platform for supporting a plurality of bottles below the tank, a plurality of cylinders connected with and movable with the tank, each of the cylinders having therein a primary and secondary piston, a connection between the upper end of the cylinder and the tank for constantly admitting the pressure within the tank to the upper end of the cylinder, a valve controlled connection with the lower end of the cylinder for admitting a relatively high actuating pressure to the lower end of the cylinder, automatic means for controlling the flow of the pressure through the last mentioned passage, a sealing head connected with the uppermost piston in the cylinder by means of a tubular piston rod adapted to convey the tank pressure to the sealing head for admission into the bottle, a filling tube connected with the lower piston and extending through the sealing head, a liquid passage leading from the tank and adapted to communicate with the filling tube when in lowered position for supplying liquid to the bottle, a sealing device mounted upon the filling tube for sealing the upper end thereof against the ingress of a medium under pressure when the filling tube is raised, a spring acting upon said sealing device for forcing the same into sealing position within the initial raising movement of the filling tube, and a float valve within the pressure supply passage leading to the sealing head, adapted to be raised by the in-flow of liquid to close such passage and prevent the back-flow of medium under pressure from the bottle, substantially as described.

10. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, and a spring for holding said sealing device in contact with the bottom of the cylinder until the liquid inlet opening in the filling tube has been housed within the sealing device and sealed against the ingress of medium under pressure from the cylinder, substantially as described.

11. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, and a sealing head adapted to seal the liquid discharge opening when the filling tube is raised, substantially as described.

12. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, a spring for holding said sealing device in contact with the bottom of the cylinder until the liquid inlet opening in the filling tube has been housed within the sealing device and sealed against the ingress of medium under pressure from the cylinder, and a sealing head adapted to seal the liquid discharge opening when the filling tube is raised, substantially as described.

13. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, a spring for holding said sealing device in contact with the bottom of the cylinder until the liquid inlet opening in the filling tube has been housed within the sealing device and sealed against the ingress of medium under pressure from the cylinder, a sealing head, and an equalization pressure passage communicating with the sealing head and adapted to be closed by the end of the filling tube when in raised position, substantially as described.

14. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, a spring for holding said sealing device in contact with the bottom of the cylinder until the liquid inlet opening in the filling tube has been housed within the sealing device and sealed against the ingress of medium under pressure from the cylinder, and a sealing head serving to seal the liquid discharge opening in the lower end of the filling tube when the latter is in raised position, substantially as described.

15. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, a spring for holding said sealing device in contact with the bottom of the cylinder until the liquid inlet opening in the filling tube has been housed within the sealing device and sealed aganist the ingress of medium under pressure from the cylinder, a sealing head, an equalization pressure passage communicating with the sealing head and adapted to be closed by the end of the filling tube when in raised position, and a piston actuating the sealing head, substantially as described.

16. In a machine for bottling liquids, the combination of a cylinder, a piston within the cylinder, a filling tube connected with the piston and provided with a liquid inlet opening near its upper end and a liquid discharge opening near its lower end, a liquid supply passage adapted to communicate with the liquid inlet opening when the filling tube is lowered, a sealing device carried by the filling tube and adapted to seal the liquid inlet opening with the rise of the tube into the interior of the cylinder, a spring for holding said sealing device in contact with the bottom of the cylinder until the liquid inlet opening in the filling tube has been housed within the sealing device and sealed against the ingress of medium under pressure from the cylinder, a sealing head serving to seal the liquid discharge opening in the lower end of the filling tube when the latter is in raised position, and a piston actuating the sealing head, substantially as described.

ADOLPH SCHNEIDER.

Witnesses:
MARY R. FROST,
FRANCES M. FROST.